(12) United States Patent
Dyer et al.

(10) Patent No.: US 11,359,739 B2
(45) Date of Patent: Jun. 14, 2022

(54) HYDRAULIC FLUID PUMP AND RETAINER ASSEMBLY FOR SAME

(71) Applicant: GD ENERGY PRODUCTS, LLC, Tulsa, OK (US)

(72) Inventors: Robert James Dyer, Coweta, OK (US); Chance Ray Mullins, Tulsa, OK (US); Peter Ross Ehlers, Tulsa, OK (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 0 days.

(21) Appl. No.: 16/127,723

(22) Filed: Sep. 11, 2018

(65) Prior Publication Data

US 2020/0080660 A1    Mar. 12, 2020

(51) Int. Cl.

| | |
|---|---|
| *F16K 27/12* | (2006.01) |
| *F01L 25/06* | (2006.01) |
| *F04B 39/14* | (2006.01) |
| *F04B 1/122* | (2020.01) |
| *F04B 53/22* | (2006.01) |
| *F16K 5/08* | (2006.01) |

(52) U.S. Cl.
CPC ............ *F16K 27/12* (2013.01); *F01L 25/066* (2013.01); *F04B 1/122* (2013.01); *F04B 39/14* (2013.01); *F04B 53/22* (2013.01); *F16K 5/08* (2013.01); *F17C 2205/0308* (2013.01)

(58) Field of Classification Search
CPC ..... F01L 25/063; F01L 25/066; F04B 1/0452; F04B 1/122; F04B 1/182; F04B 39/14; F04B 53/101; F04B 53/1012; F04B 53/1032; F04B 53/1035; F04B 53/1085; F04B 53/22; F16K 5/08; F16K 27/12; F16K 15/025; F17C 2205/0308; F17C 2205/0311; F17C 2205/0335
USPC ........................................................ 137/382
See application file for complete search history.

(56) References Cited

U.S. PATENT DOCUMENTS

| | | | |
|---|---|---|---|
| 2,649,988 A | 8/1953 | Campbell | |
| 3,185,337 A * | 5/1965 | Long ....................... | F17C 13/06 220/233 |
| 3,278,069 A | 10/1966 | Pangburn | |
| 3,278,070 A | 10/1966 | Pangburn | |
| 3,363,647 A | 1/1968 | Cornelsen et al. | |
| 3,435,777 A * | 4/1969 | Schaaf ..................... | F16B 31/04 292/256.71 |
| 3,599,825 A * | 8/1971 | Jorgensen ................ | F16J 12/00 220/327 |
| 4,810,919 A * | 3/1989 | Ponce .................. | H02K 15/024 29/596 |

(Continued)

*Primary Examiner* — Kevin F Murphy
*Assistant Examiner* — Jonathan J Waddy
(74) *Attorney, Agent, or Firm* — Edell, Shapiro & Finnan, LLC

(57) ABSTRACT

A fluid end assembly of a hydraulic fluid pump includes a housing having a bore, a removable valve cover closing the bore, and a retainer engaging the bore. The retainer includes a set screw bore that extends from a first side of the retainer to a second side of the retainer, opposite the first side. The fluid end assembly further includes a set screw. The set screw is threaded into the set screw bore from the first side of the retainer. The set screw is not removable from the second side of the retainer. The first side of the retainer is positioned adjacent to the valve cover.

19 Claims, 7 Drawing Sheets

(56) References Cited

U.S. PATENT DOCUMENTS

| | | | | |
|---|---|---|---|---|
| 5,083,889 | A * | 1/1992 | Steinbock | B21B 27/035 403/320 |
| 6,209,445 | B1 * | 4/2001 | Roberts, Jr. | F04B 53/168 92/128 |
| 7,335,002 | B2 * | 2/2008 | Vicars | F04B 53/007 137/512 |
| 7,866,346 | B1 * | 1/2011 | Walters | E21B 21/01 138/89 |
| 8,360,094 | B2 | 1/2013 | Steinbock et al. | |
| 10,041,594 | B2 * | 8/2018 | Patterson | F16B 31/04 |
| 2005/0166385 | A1 | 8/2005 | Steinbock et al. | |
| 2005/0201881 | A1 | 9/2005 | Jensen et al. | |
| 2005/0226754 | A1 | 10/2005 | Orr et al. | |
| 2008/0093361 | A1 | 4/2008 | Kennedy et al. | |
| 2010/0054974 | A1 | 3/2010 | Riley et al. | |
| 2010/0143163 | A1 | 6/2010 | Patel et al. | |
| 2011/0283537 | A1 | 11/2011 | Case et al. | |
| 2016/0369909 | A1 | 12/2016 | Deel | |
| 2017/0089334 | A1 | 3/2017 | Jahnke | |
| 2017/0089473 | A1 | 3/2017 | Nowell et al. | |
| 2017/0107983 | A1 | 4/2017 | Patterson et al. | |

\* cited by examiner

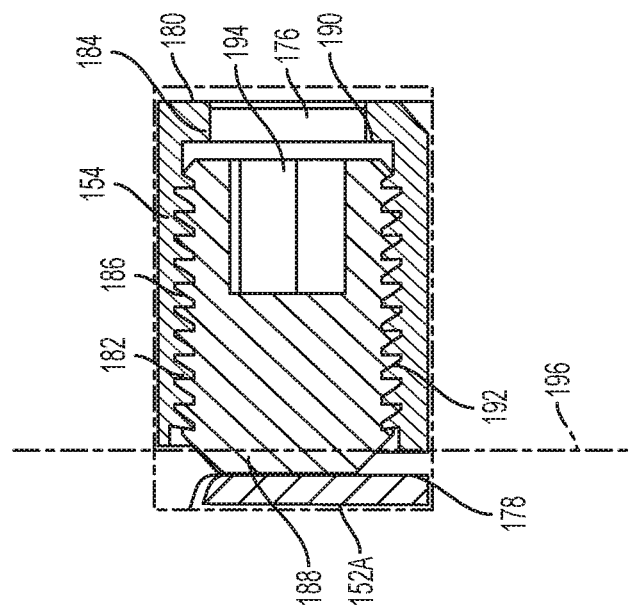
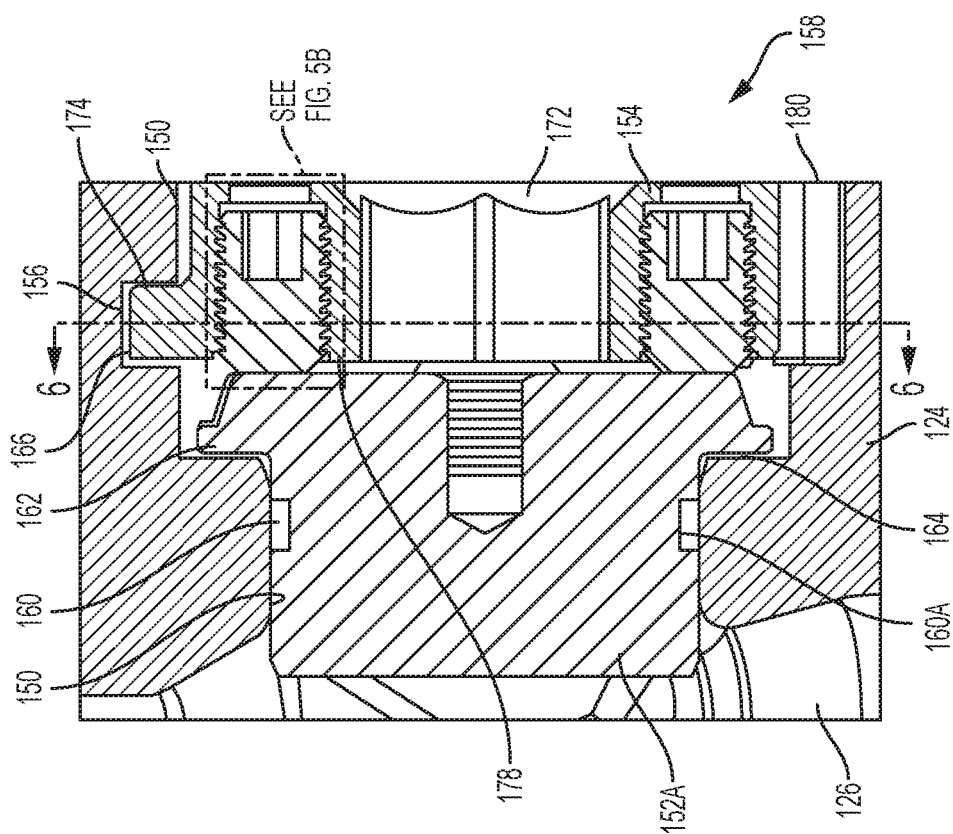
FIG. 5B
FIG. 5A

HYDRAULIC FLUID PUMP AND RETAINER ASSEMBLY FOR SAME

FIELD OF THE INVENTION

The present invention relates to a hydraulic fluid pump and, more particularly, to a fluid end assembly of a hydraulic fluid pump.

SUMMARY

In one embodiment, the invention provides a fluid end assembly of a hydraulic fluid pump. The fluid end assembly includes a housing having a bore, a removable valve cover closing the bore, and a retainer engaging the bore. The retainer includes a set screw bore that extends from a first side of the retainer to a second side of the retainer, opposite the first side. The fluid end assembly further includes a set screw. The set screw is threaded into the set screw bore from the first side of the retainer. The set screw is not removable from the second side of the retainer. The first side of the retainer is positioned adjacent to the valve cover.

In another embodiment, the invention provides a method of assembling and preloading a removable valve cover within a fluid end assembly of a hydraulic fluid pump. The removable valve cover is inserted into a bore of the fluid end assembly. A set screw is threaded into a set screw bore in a retainer. The set screw bore extends from a first side of the retainer to a second side of the retainer, opposite the first side. The retainer is inserted into the bore. The axial position of the set screw is adjusted within the set screw bore to extend through a plane defined by the first side and to concurrently apply a preload to the removable valve cover.

In yet another embodiment, the invention provides a retainer assembly operable to hold a removable valve cover within a bore of a fluid end assembly. The retainer assembly includes a retainer comprising an external engagement feature operable to engage the bore and a set screw bore that extends from a first side of the retainer to a second side of the retainer opposite the first side. The retainer assembly further includes a set screw threaded into the set screw bore from the first side of the retainer. The set screw bore includes a threaded portion extending from the first side and a non-threaded portion extending from the threaded portion toward the second side.

Other aspects of the invention will become apparent by consideration of the detailed description and accompanying drawings.

BRIEF DESCRIPTION OF THE DRAWINGS

FIG. 5A is a side view of a plug assembly according to another embodiment, the plug assembly having a valve cover and a retainer.
FIG. 5B is an enlarged view of a set screw within the plug assembly.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
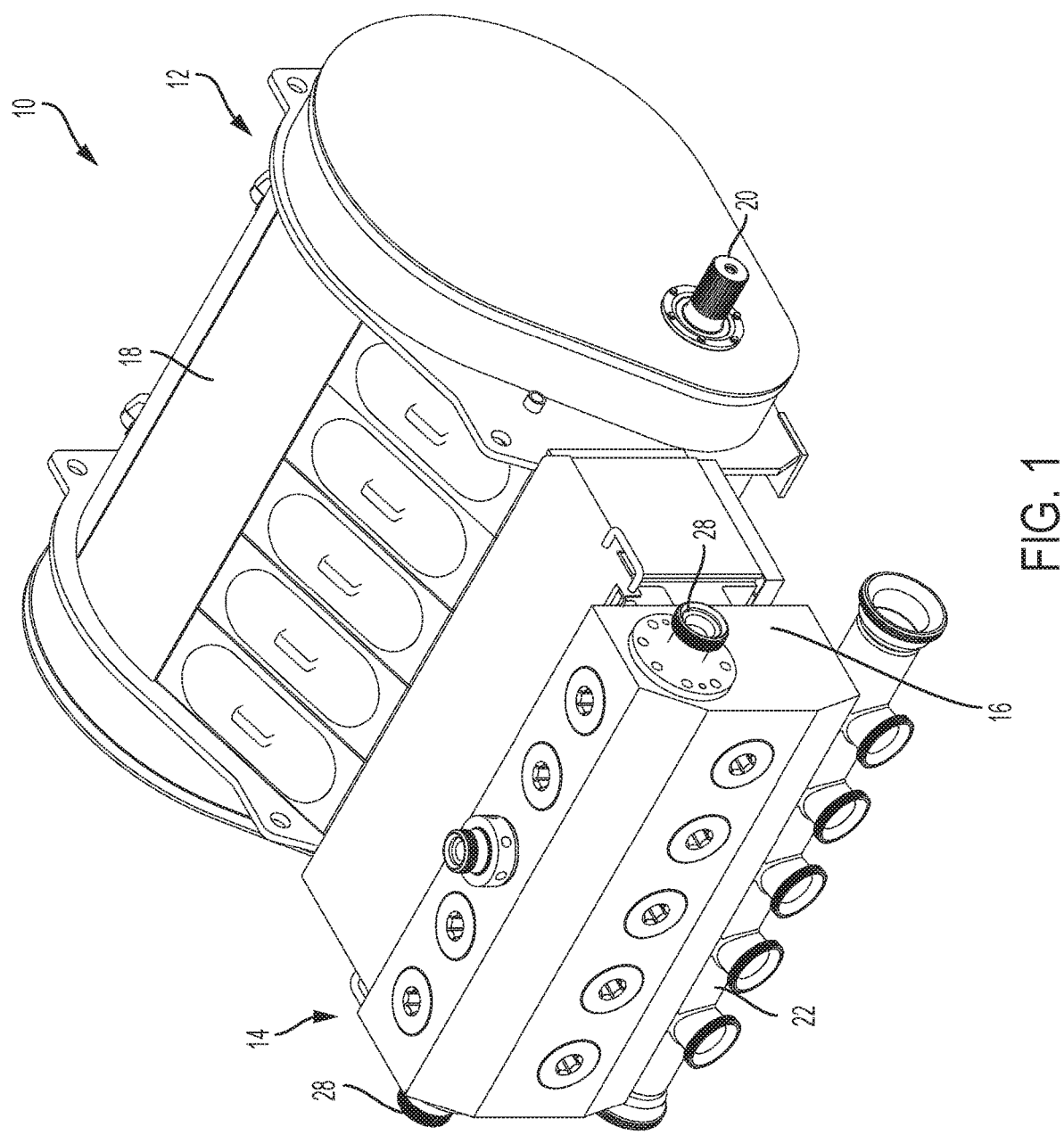
FIG. 1 is a perspective view of a hydraulic fluid pump

FIG. 1 illustrates a hydraulic fluid pump 10 of the type often used during drilling and hydraulic fracturing operations such as hydrocarbon or oil fracturing. The hydraulic fluid pump 10 includes a drive end or drive end assembly 12 that is largely enclosed within a casing 18. A fluid end or fluid end assembly 14 attaches to the drive end 12 and the casing 18 and includes at least one fluid end block 16. A drive shaft 20 extends out of the casing 18 and provides for a connection point for a prime mover such as a motor or engine. The prime mover drives the drive shaft 20 at a desired speed to power the drive end 12. The drive end 12 typically includes a transmission (e.g., gears, belts, chains, etc.) that serve to step down the speed of the drive shaft 20 to a speed appropriate for the fluid end 14. The drive end 12 includes a series of reciprocating mechanisms that in turn drives a piston or plunger (e.g., piston 46 shown in FIG. 2) within a respective bore of the fluid end block 16 to pump a fluid.

Figure 2:
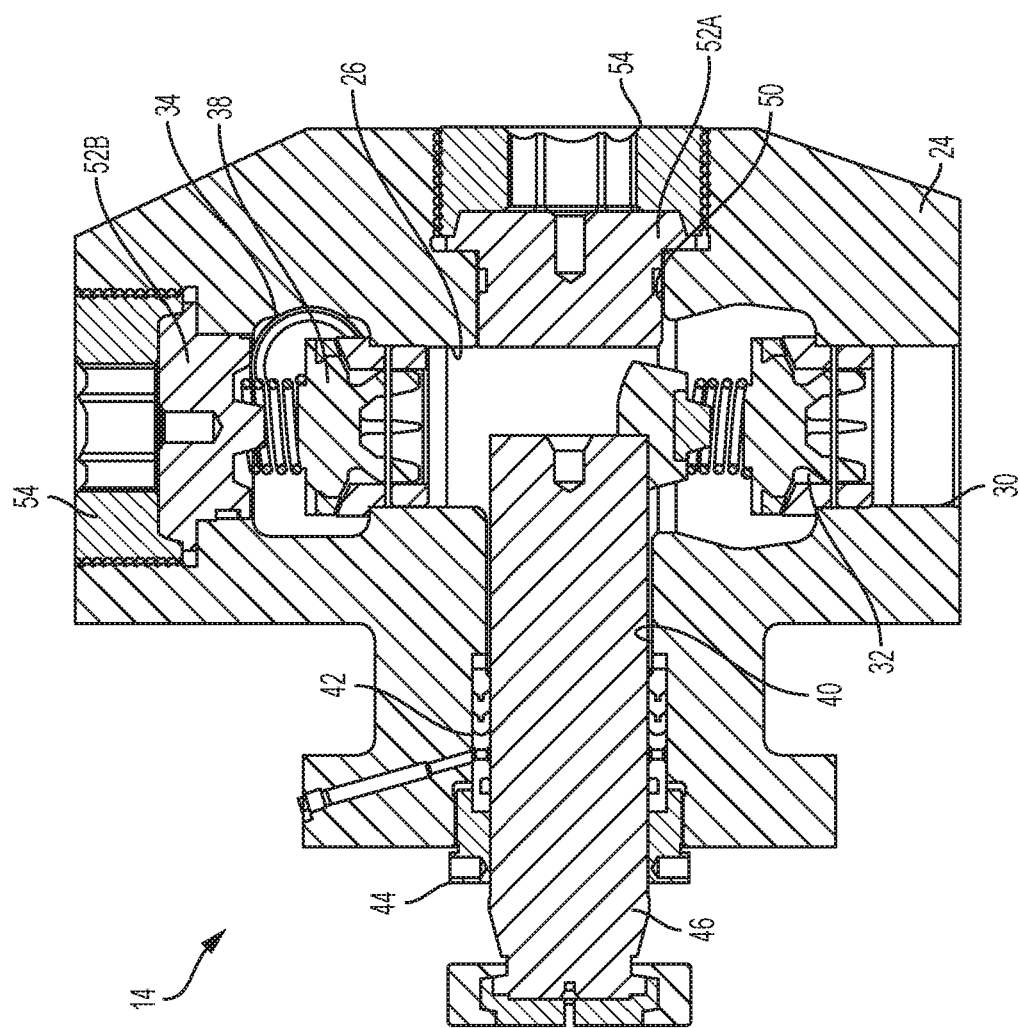
FIG. 2 is a cross-sectional view of a fluid end assembly of a hydraulic fluid pump.

The fluid end 14 is better illustrated in FIG. 2. A housing 24 defines the main body of the fluid end assembly 14 surrounding an interior volume 26. An inlet manifold 22 (FIG. 1) distributes fluid to an inlet bore 30 of each fluid end block 16. An inlet valve 32 is positioned in the inlet bore 30 to control flow from the inlet manifold 22 into the interior volume 26 of the fluid end 14, and more specifically, the interior volume 26 of the housing 24. An outlet bore 34 directs pressurized fluid from the interior volume 26, past an outlet valve 38, and to an outlet manifold integrated into the fluid end 14 and having an outlet 28 (FIG. 1) from the fluid end 14. The outlet manifold 28 is in fluid communication with the fluid end block 16 via the outlet bore 34 and outlet valve 38. As shown, the inlet and outlet bores 30, 34 are axially aligned with one another.

A piston bore 40 extends perpendicular to the inlet and outlet bores 30, 34 and supports a packing arrangement 42 and piston retainer 44. The reciprocating piston 46 is movable within the piston bore 40 relative to the packing arrangement 42 and the retainer 44 to pressurize fluid within the interior volume 26 and to the outlet manifold 28. A service bore 50 is formed in the housing 24 parallel with and axially aligned with the piston bore 40 and provides access to the interior volume 26 of the housing 24 without removal of the piston 46, or the valves 32, 38. The service bore 50 may additionally provide access for insertion and removal of the piston 46 and/or the inlet valve 32 from the remainder of the pump 10.

As shown, both the outlet bore 34 and the service bore 50 include valve covers 52A, 52B and retainers 54. The valve covers 52A, 52B seal against the housing 24 to prevent fluid from the interior volume 26 from passing through the respective bores 34, 50. Each retainer 54 applies a force to the respective valve cover 52A, 52B to hold the valve cover 52A, 52B in a sealing position against the housing 24. When the reciprocating piston 46 increases the pressure of the fluid within the interior volume 26 of the housing 24, a force is applied on the valve covers 52A, 52B (either directly, as with the valve cover 52A of the service bore 50, or indirectly, as with the valve cover 52B of the outlet bore 34). The retainer 54 applies a preload to the valve cover 52A, 52B to counteract the force applied by the pressurized fluid and to prevent unseating of the valve cover 52A, 52B from the housing 24.

The retainer assemblies 58, 158 and valve covers 52A shown in FIGS. 3A-7 are illustrated with respect to the service bore 50. However, the retainer assemblies 58, 158 can be equally applied to the valve cover 52B.

Figure 3B:
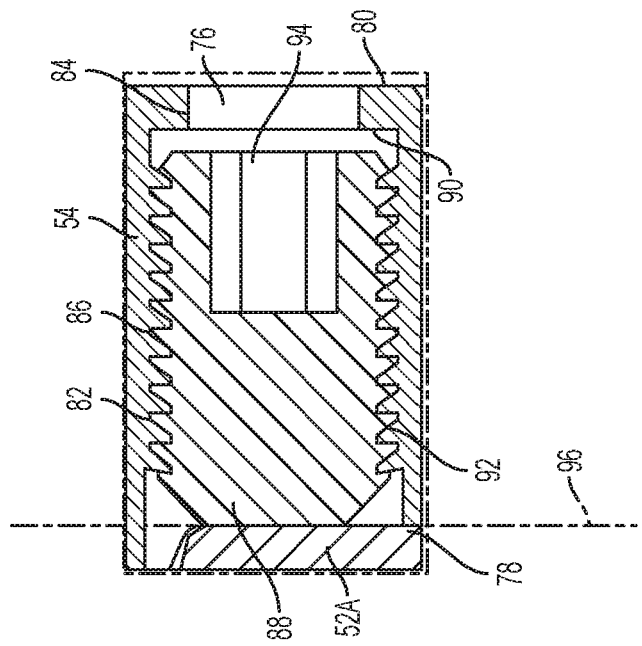
FIG. 3B is an enlarged view of a set screw within the plug assembly.
Figure 3A:
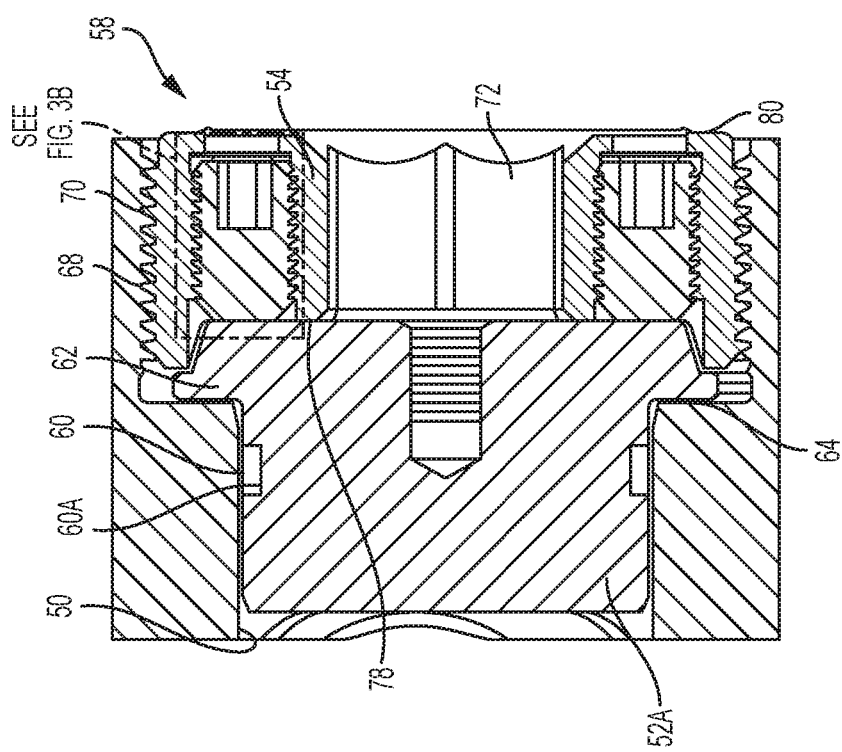
FIG. 3A is a side view of a plug assembly of one embodiment, the plug assembly having a valve cover and a retainer.
Figure 4:
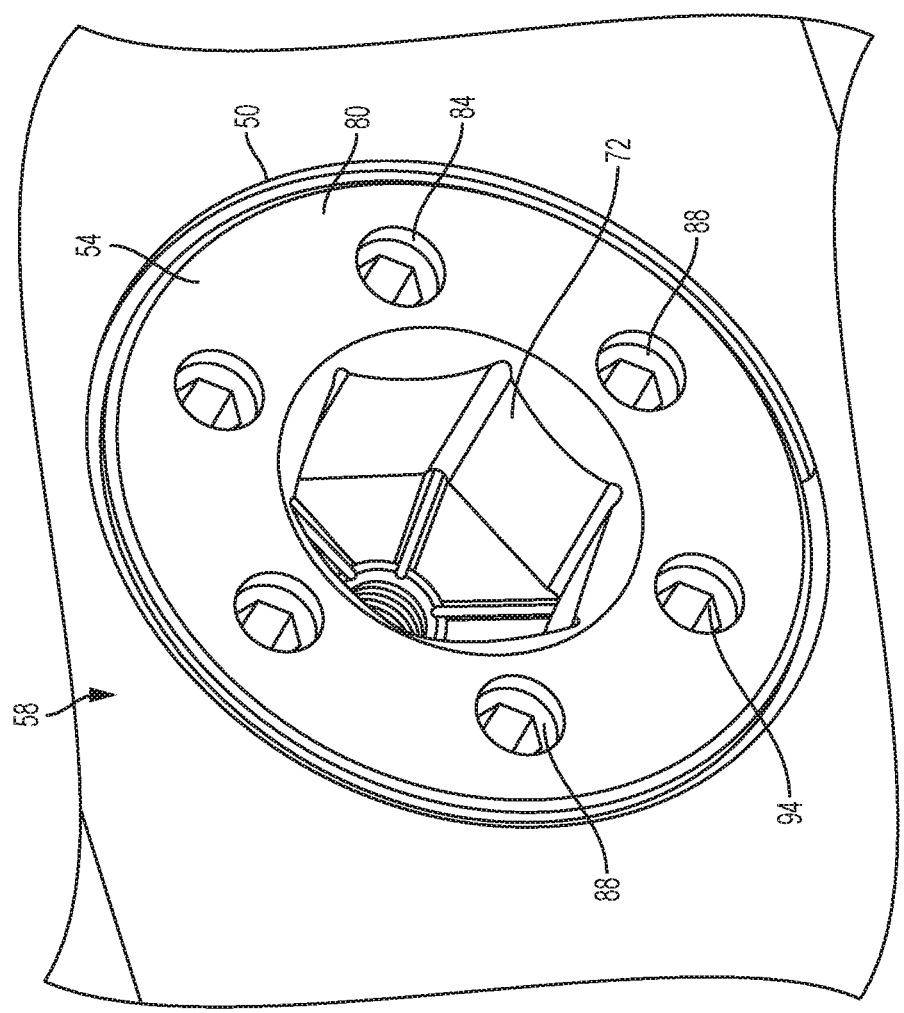
FIG. 4 is a perspective view of the plug assembly of FIG. 2A.

As shown in FIGS. 3A, 3B, and 4, the valve cover 52A is inserted into the service bore 50 and includes a radial seal 60 positioned within a channel 60A in the valve cover 52A to provide a seal between the valve cover 52A and the housing 24. The valve cover 52A can additionally or alternatively be provided with an axial seal to engage the housing 24. The valve cover 52A is generally cylindrical with a diameter similar to the diameter of the bore 50. The valve cover 52A further includes a lip portion 62 for engaging a step 64 in the service bore 50. The valve cover 52A is not threaded or otherwise fastened to the bore 50, outside of a clearance fit and/or friction provided by the radial seal 60.

The bore 50 shown in FIGS. 3A, 3B, and 4 is a threaded bore having internal threads 68 extending axially through at least a portion of the bore 50. The retainer 54 includes external threads 70 that mate with the internal threads 68 of the bore 50. As shown, the threads 68, 70 include an angled portion and a radial (vertical) portion. The radial interface of the threads 68, 70 provides resistance against axial forces applied on the valve cover 52A (and therefore the retainer 54) perpendicular to the radial interface of threads 68, 70. The threads 68 extend to a depth such that the retainer 54 can be threaded into abutment with the valve cover 52A when the valve cover 52A is in the sealing position. The retainer 54 further includes a central engagement feature 72 for engagement by an adjustment tool (not shown). As shown, the central engagement feature 72 is a central hex drive engageable by a wrench. When engaged by an adjustment tool, an operator is able to able to threadedly insert the retainer 54 into the bore 50 and into engagement with the valve cover 52B.

The retainer 54 further includes a plurality of set screw bores spaced radially equidistant about the center of the retainer 54. The set screw bores 76 extend axially through the retainer 54 from a first (inward facing) axial end 78 of the retainer 54 adjacent the valve cover 52A to a second (outwardly facing) axial end 80 of the retainer 54 opposite the first axial end 78. A first portion 82 of each set screw bore 76 is threaded having internal threads 86. The threaded portion 82 extends from the first axial end 78 of the retainer 54 and terminates prior to the second axial end 80. A second portion 84 of each set screw bore 76 is unthreaded. The unthreaded portion 84 extends from the threaded portion towards the second axial end 80. In some embodiments, the unthreaded portion 84 may extend to the second axial end 80. The unthreaded portion 84 has a diameter that is less than a major diameter of the threaded portion 84. Therefore, a set screw 88 is insertable into the set screw bore 76 via the first axial end 78 onto the threaded portion 82, but is not insertable into the set screw bore 76 via the second axial end 80. A backstop 90 is defined at the interface between the threaded and unthreaded portions 82, 84 within the set screw bore 76 and defines a furthest insertion limit of the set screw 88 into the set screw bore 76.

Each set screw 88 includes external threads 92 for threadedly engaging the internal threads 86 of the set screw bore 76 and is insertable into the set screw bore 76 via the first axial end of the retainer 54. Each set screw 88 further includes a tool interface 94 for engagement by an adjustment tool (not shown) for rotatably adjusting the axial position of the set screw 88 and setting a preload on the valve cover 52A. The retainer assembly 58 is collectively defined by the retainer 54 and the set screws 88.

In some embodiments, the retainer 54 may include only a single set screw bore 76 (e.g., centered within the retainer 54), as described above. In such embodiments, only a single set screw 88 is threaded into the set screw bore 76 and tightened against the valve cover 52A to set a preload. The single set screw 88 and set screw bore 76 may be larger in size with deeper threads to account for the decrease in quantity of set screws 88 and total surface area in contact with the valve cover 52A.

In operation, to preload the removable valve cover 52A (or, alternatively, the removable valve cover 52B), the valve cover 52A is inserted into the bore 50 and is seated against the step 64, with the radial seal 60 blocking a leakage path from the interior volume 26 of the housing 24. The set screws 88 (or single set screw 88) are threaded onto the threaded portion 82 of the set screw bores 76, inserted into the bores 76 via the first axial end 78. Once the set screws 88 are threaded into the set screw bores 76, the retainer 54 is threaded onto the internal threads 68 of the bore 50 until one of the set screws 88 and the first axial end 78 of the retainer 54 engage (e.g., abut, contact) the valve cover 52A. Once in contact, torque is applied to the set screws 88 (e.g., sequentially, in a star pattern, etc.) to apply a preload force to the valve cover 52A. Preloading the valve cover 52A prevents or limits seal movement when pressure is applied in the internal volume 26 of the housing 24. When the set screws 88 apply a preload to the valve cover 52A, they extend partially out of the set screw bores 76 such that they extend into a plane 96 defined by the first axial end 78 (i.e., the inner axial end) of the retainer 54.

In operation, to remove the retainer assembly 58, the set screws 88 (or single set screw 88) are rotated to axially translate away from the valve cover 52A to remove the preload. However, the set screws 88 cannot be fully removed from the retainer 54 while the retainer 54 is threaded into the bore 50, as they will abut the backstop 90 at the interface between the threaded and unthreaded portions 82, 84 when fully rotated along the axial length of the threaded portion 82. This prevents loss of set screws 88 during assembly and disassembly (e.g., for maintenance and/or part replacement) and prevents accidental removal of a set screw when the pump 10 is in use. Once the preload is fully removed by loosening the set screws 88 away from the valve cover 52A, the retainer assembly 58 is rotated relative to the bore 50 until fully unthreaded. At that time, the valve cover 52A can be accessed for removal or inspection.

FIGS. 5A-7 illustrate another embodiment of the invention. Like elements are indicated by like reference numerals incremented by 100 and are similar to those elements except as otherwise described.

Figure 6:
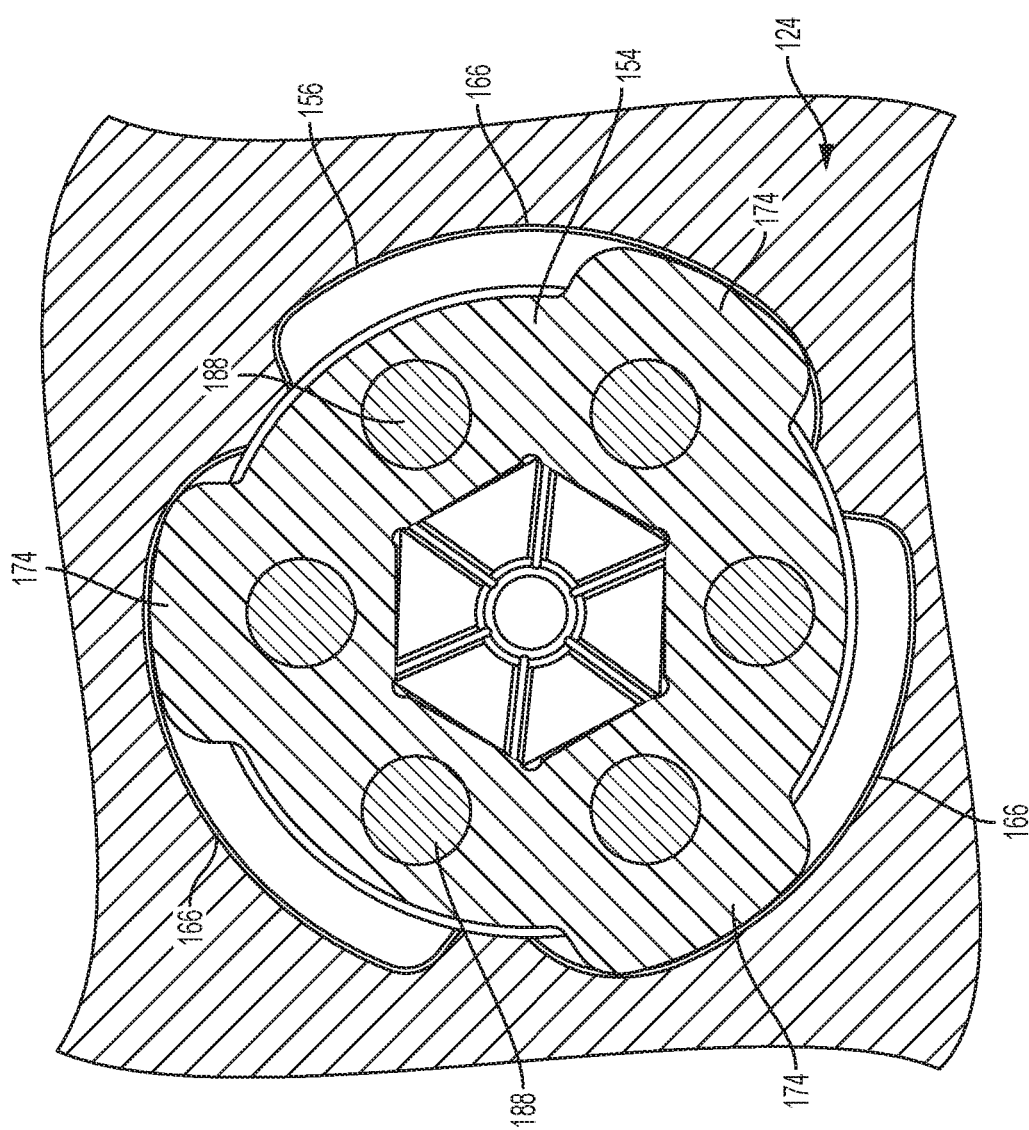
FIG. 6 is a front view of the plug assembly of FIG. 4A through section line A-A.
Figure 7:
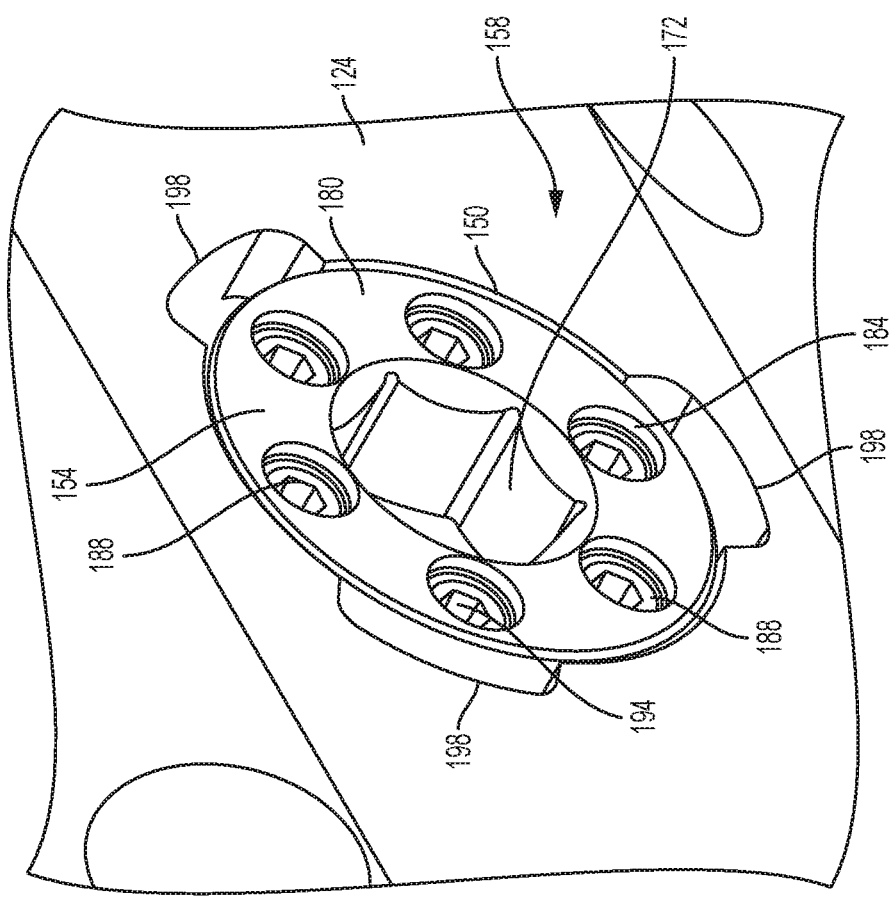
FIG. 7 is a perspective view of the plug assembly of FIG. 4A.

As shown in FIG. 5A, the bore 150 is modified relative to the bore 50 shown in FIGS. 2-4. The diameter and shape of the bore 150 vary along the length of the bore 150. Similar to the bore 50, the bore 150 includes a stop 164 for supporting the valve cover 152A. Further, the bore 150 includes a recessed channel 156 having a non-circular cross-sectional area, as shown in the section A-A of FIG. 6. The cross-sectional area of the recessed channel 156 includes three distinct recesses 166, each recess 166 spanning approximately 100 degrees, and narrowing therebetween. The recessed channel 156 is positioned at a depth within the housing 124 adjacent the step 164. As shown in FIG. 7, the portion of the bore 150 between the exterior of the housing 124 and the recessed channel 156 is likewise non-circular, having recesses 198 similar to the distinct recesses 166 of the recessed channel 156, though narrower (e.g., approximately 45 degrees each). One radial edge of each recess 198 is aligned with a similar radial edge of the recess 166. The bore 150 is not a threaded bore.

As the bore 150 does not include threads for mating with a retainer 154, the retainer 154 is likewise modified to engage the bore 150. As shown in FIG. 6, the retainer 154 includes three peripheral lobes 174 that extend radially outward from the remainder of the retainer 154. The peripheral lobes 174 are spaced equidistant from one another about the periphery of the retainer 154 and are sized to fit within the recesses 198. The retainer 154 can include more or less lobes 174 to appropriately coincide with the number of distinct recesses in the bore 150. In some embodiments, this may be referred to as a bayonet-style connection or bayonet connection.

In operation, to preload the removable valve cover 152A, the valve cover 152A is inserted into the bore 150 and is seated against the step 164, with the radial seal 160 blocking a leakage path from the interior volume 126 of the housing 124. The set screws 188 (or single set screw 188) are threaded onto the threaded portion 182 of the set screw bores 176, inserted into the bores 176 via the first axial end 178. Once the set screws 188 are threaded into the set screw bores 176, the retainer 154 is axially inserted into the bore 150, with the peripheral lobes 174 aligned with the recesses 198. Once the first axial end 178 of the retainer 154 reaches the appropriate depth (e.g., the first axial end 178 abuts the valve cover 152A, the retainer 154 is rotatable relative to the bore 150, the second axial end 178 is flush with the exterior of the housing 124), the retainer 154 is rotated such that the peripheral lobes are not aligned with the recesses 198, but are instead located within the recesses 166, misaligned with the recesses 198 in a locked position. An adjustment tool, such as a wrench (not shown), in engagement with a central engagement feature 172 can be used to rotate the retainer 154 relative to the bore 150. Once in the locked position, torque is applied to the set screws 188 (e.g., sequentially, in a star pattern etc.) by extending an adjustment tool (e.g., a wrench) through an unthreaded portion 184 of the set screw bore 176 and into engagement with the tool interface 194 of the respective set screw 188 to apply a preload force to the valve cover 152A. Preloading the valve cover 152A prevents or limits seal movement when pressure is applied in the internal volume 126 of the housing 124. When the set screws 188 apply a preload to the valve cover 152A, they extend partially out of the set screw bores 176 such that they extend into a plane 196 defined by the first axial end 178 (i.e., the inner axial end) of the retainer 154.

In operation, to remove the retainer assembly 158, the set screws 188 (or single set screw 188) are rotated to axial translate away from the valve cover 152A to remove the preload. However, the set screws 188 cannot be fully removed from the retainer 154 while the retainer 154 is positioned within the bore 150, as they will abut the backstop 190 at the interface between the threaded and unthreaded portions 182, 184 when fully rotated along the axial length of the threaded portion 182. This prevents full removal of the set screws 188 past the first axial end 180 of the retainer 154, prevents loss of set screws when working, and prevents accidental removal of a set screw when the pump 10 is in use. Once the preload is fully removed by loosening the set screws 188 away from the valve cover 152A, the retainer assembly 158 is rotated relative to bore 150 until the peripheral lobes 174 are aligned with the recesses 198. Then the retainer 154 can be axially removed from the bore 150. At that time, the valve cover 152A can be accessed for removal or inspection.

Various features and advantages of the invention are set forth in the following claims.

What is claimed is:

1. A method of assembling and preloading a removable valve cover within a fluid end assembly of a hydraulic fracturing fluid pump, the method comprising:
   inserting the removable valve cover into a first bore of a monolithic housing of the fluid end assembly, the monolithic housing defining a plurality of pairs of intersecting bores, wherein each pair of intersecting bores defines an internal volume, so that the monolithic housing includes a plurality of laterally spaced internal volumes configured to receive fluid from an inlet manifold of the hydraulic fracturing fluid pump;
   threading a set screw into a set screw bore via a first side of a retainer, the set screw bore extending from the first side of the retainer to a second side of the retainer, opposite the first side, and the set screw bore including a threaded portion extending from the first side and a non-threaded portion extending from the second side;
   inserting the retainer into the first bore of the monolithic housing such that the first side of the retainer is adjacent to the removable valve cover; and
   adjusting an axial position of the set screw within the set screw bore to extend through a plane defined by the first side and to concurrently apply a preload to the removable valve cover by inserting an adjustment tool through the non-threaded portion of the set screw bore and into the threaded portion of the set screw bore.

2. The method of claim 1, wherein inserting the retainer into the first bore of the monolithic housing includes threading the retainer into the first bore of the monolithic housing.

3. The method of claim 1, wherein inserting the retainer into the first bore of the monolithic housing includes axially inserting the retainer into the first bore of the monolithic housing and then rotating the retainer relative to the first bore of the monolithic housing to position one or more peripheral lobes of the retainer into a recessed channel of the first bore of the monolithic housing.

4. The method of claim 1, wherein the set screw is threaded into the set screw bore prior to inserting the retainer into the first bore of the monolithic housing.

5. The method of claim 1, wherein inserting the removable valve cover includes placing the removable valve cover in a sealing position, and wherein applying the preload holds the removable valve cover in the sealing position.

6. The method of claim 1, wherein the retainer defines a backstop such that the adjusting of the axial position in a direction away from the removable valve cover over a predetermined distances moves the set screw into abutment with the backstop.

7. The method of claim 1, wherein the fluid end assembly comprises a reciprocating piston operable to pressurize fluid at the removable valve cover.

8. The method of claim 1, wherein the first bore of the monolithic housing is one of an outlet valve bore or a service bore.

9. A fluid end assembly of a hydraulic fracturing fluid pump comprising:

a monolithic housing defining a plurality of pairs of intersecting bores, wherein each pair of intersecting bores defines an internal volume, so that the monolithic housing includes a plurality of laterally spaced internal volumes configured to receive fluid from an inlet manifold of the hydraulic fracturing fluid pump;

a removable valve cover closing a first bore of the plurality of pairs of intersecting bores defined by the monolithic housing, the removable valve cover being positioned within the first bore of the monolithic housing;

a retainer positioned within the first bore of the monolithic housing and engaging the first bore of the monolithic housing, the retainer comprising a set screw bore that extends from a first side of the retainer to a second side of the retainer, opposite the first side; and a set screw threaded into the set screw bore from the first side of the retainer, wherein the set screw is not removable from the second side of the retainer, and wherein the first side of the retainer is positioned adjacent to the removable valve cover.

10. The fluid end assembly of claim 9, wherein the first bore of the monolithic housing is a threaded bore, and wherein the retainer includes external threads that engage threads of the first bore of the monolithic housing.

11. The fluid end assembly of claim 9, wherein the first bore of the monolithic housing includes a recessed channel, and wherein the retainer includes a plurality of peripheral lobes that engage the recessed channel.

12. The fluid end assembly of claim 9, wherein the first side of the retainer is in facing relation with the removable valve cover.

13. The fluid end assembly of claim 9, wherein the first side defines a plane, and wherein the set screw is positioned within the plane to abut the removable valve cover.

14. The fluid end assembly of claim 9, wherein the set screw includes a tool interface, wherein the set screw is drivable via the tool interface in a first direction into abutment with the removable valve cover and in a second direction into abutment with a backstop integral with the retainer.

15. The fluid end assembly of claim 9, wherein the set screw is operable to preload the removable valve cover.

16. The fluid end assembly of claim 9, wherein the first bore of the monolithic housing is one of an outlet valve bore or a service bore.

17. The fluid end assembly of claim 9, further comprising a reciprocating piston operable to pressurize fluid at the removable valve cover.

18. The fluid end assembly of claim 9, wherein the set screw bore includes a threaded portion extending from the first side and a non-threaded portion extending from the second side.

19. The fluid end assembly of claim 9, wherein the set screw is threaded into the set screw bore prior to positioning the retainer within the first bore of the monolithic housing.

* * * * *